(12) United States Patent
Flynn

(10) Patent No.: US 10,992,511 B2
(45) Date of Patent: Apr. 27, 2021

(54) MACHINE-IMPLEMENTED METHOD OF DYNAMICALLY ENCRYPTING DATA

(71) Applicant: Thomas Malcolm Flynn, Bath (GB)

(72) Inventor: Thomas Malcolm Flynn, Bath (GB)

( * ) Notice: Subject to any disclaimer, the term of this patent is extended or adjusted under 35 U.S.C. 154(b) by 137 days.

(21) Appl. No.: 15/748,384

(22) PCT Filed: Jul. 29, 2016

(86) PCT No.: PCT/GB2016/052358
§ 371 (c)(1),
(2) Date: Jan. 29, 2018

(87) PCT Pub. No.: WO2017/017477
PCT Pub. Date: Feb. 2, 2017

(65) Prior Publication Data
US 2018/0227163 A1    Aug. 9, 2018

(30) Foreign Application Priority Data
Jul. 29, 2015   (GB) ...................... 1513316

(51) Int. Cl.
*H04L 29/06*    (2006.01)
*H04L 9/16*     (2006.01)
*H04L 9/14*     (2006.01)

(52) U.S. Cl.
CPC .............. *H04L 29/067* (2013.01); *H04L 9/14* (2013.01); *H04L 9/16* (2013.01); *H04L 63/0428* (2013.01);
(Continued)

(58) Field of Classification Search
CPC . H04L 29/067; H04L 9/14; H04L 9/16; H04L 63/0428; H04L 63/18; H04L 2209/34; H04L 2463/041
See application file for complete search history.

(56) References Cited

U.S. PATENT DOCUMENTS

| 5,115,428 A |   | 5/1992 | Ramanan et al. |
|---|---|---|---|
| 5,592,552 A | * | 1/1997 | Fiat .................... H04L 63/0442 380/278 |

(Continued)

FOREIGN PATENT DOCUMENTS

| WO | WO 1999/044329 | 9/1999 |
|---|---|---|
| WO | WO 2003/001398 | 1/2003 |
| WO | WO 2012/167227 | 12/2012 |

OTHER PUBLICATIONS

Combined Search and Examination Report for GB 1513316.8 dated Sep. 23, 2015, 9 pp.
(Continued)

*Primary Examiner* — Anthony D Brown
*Assistant Examiner* — Rodman Alexander Mahmoudi
(74) *Attorney, Agent, or Firm* — Lathrop GPM LLP

(57) ABSTRACT

A machine-implemented method of encoding/decoding data is described. The encoding method comprises steps of receiving a message of a given size, the message being represented by a series of units of data, configuring multiple encoding elements (50) in an arrangement having a given frame size, and encoding the message by passing each unit of data through the arrangement so that each unit is processed by at least one of the encoding elements. The frame size of the arrangement is the maximum number of units of data that can pass through the arrangement without any unit of data passing through the arrangement and being processed in the same way as another unit of data. The configuring of the arrangement defines how each unit of data is processed by the encoding elements and creates an arrangement corresponding to a frame size that is dependent upon the number of units of data in the series, for example so that the frame size of the arrangement is guaranteed to be greater than the number of units of data in the series.

21 Claims, 8 Drawing Sheets

(52) U.S. Cl.
CPC .......... *H04L 63/18* (2013.01); *H04L 2209/20* (2013.01); *H04L 2209/34* (2013.01); *H04L 2463/041* (2013.01)

(56) References Cited

U.S. PATENT DOCUMENTS

| | | |
|---|---|---|
| 6,823,069 B1 | 11/2004 | Kitajima et al. |
| 8,824,672 B1 | 9/2014 | Gomathisankaran et al. |
| 2001/0037457 A1 | 11/2001 | Inada |
| 2005/0036608 A1 | 2/2005 | Launchbury et al. |
| 2007/0255941 A1 | 11/2007 | Ellis |
| 2008/0151937 A1* | 6/2008 | Lee .................... H04N 21/2383 370/476 |
| 2009/0044072 A1* | 2/2009 | Oh .................... H03M 13/2707 714/758 |
| 2010/0211787 A1* | 8/2010 | Bukshpun ............. H04L 9/0838 713/170 |
| 2016/0112724 A1* | 4/2016 | Hendry ............. H04N 21/2401 375/240.25 |

OTHER PUBLICATIONS

International Search Report of PCT/GB2016/052358 dated Oct. 28, 2016, 4 pp.

\* cited by examiner

MACHINE-IMPLEMENTED METHOD OF DYNAMICALLY ENCRYPTING DATA

FIELD OF THE INVENTION

The present invention concerns cryptography methods and related apparatus.

More particularly, but not exclusively, this invention concerns a computer implemented method of encoding data, computer implemented method of decoding previously encoded data, and related apparatus and software.

BACKGROUND OF THE INVENTION

In the field of internet and network security, there is a prevalent need for secure means of transmitting and sharing data between different parties, for example between content providers and content users. Encryption of data is a widely used technique for securing messages; however, as the sophistication of attacks increases, there is a growing need for increasingly complex encryption techniques, requiring large amounts of computer processing power.

Data is typically broken down into smaller blocks which are then processed in a way that encrypts the data. Many encryption methods of the prior art process similar blocks in the same way, leading to potential weaknesses in the system.

Certain methods of cryptography of the prior art use known protocols for encoding a message, where the only unknown parameter is the knowledge of a single secret, or private key. Once the private key is discovered by an eavesdropper, the encoded message may be decoded by the eavesdropper. Certain cryptography methods may be vulnerable to brute-force attacks, for example. There may be certain applications for encryption that require a greater level of security.

The use of complex variable, or reconfigurable networks of encoding elements which encrypt each message in a different way increases the challenge posed to attackers attempting to decode encrypted messages. However, complex, reconfigurable networks are likely to be computationally expensive and may not mitigate the security risks associated with repeating the same action on multiple parts of the message.

US2007/255941 describes a method of securing data sets that involves dynamically hopping amongst a variety of encryption protocols, in a manner determined by a reconfigurable logic array. This improves security of messages by encrypting each message in a different way, but may be computationally expensive. Similarly, U.S. Pat. No. 6,823,069 describes a programmable logic device for dynamically changing encryption algorithms.

The present invention seeks to mitigate one or more of the above-mentioned problems. Alternatively or additionally, the present invention seeks to provide an encryption method with increased security. Alternatively or additionally, the present invention seeks to provide an improved method of encoding data. Alternatively or additionally, the present invention seeks to provide an alternative encryption system.

SUMMARY OF THE INVENTION

According to a first aspect, the present invention provides a method of encoding data, which is machine implemented for example by computer hardware/software and/or other electronic hardware. The method comprises receiving a message of a given size, the message being represented by a series of units of data, configuring multiple encoding elements in an arrangement, and encoding the message by passing each unit of data through the arrangement, so that each unit is processed by at least one of the encoding elements. The message may be in the form of any information. The configuration of the arrangement defines how each unit of data is processed by the encoding elements, and creates an arrangement corresponding to a frame size that is dependent upon the number of units of data in the series. The frame size of the arrangement is defined as the maximum number of units of data that can pass through the arrangement without any unit of data passing through the arrangement and being processed in the same way as another unit of data.

In an embodiment of the invention, the way in which the frame size of the encoding arrangement is dependent upon the length of the message to be encoded can be chosen to suit the particular circumstances at hand. It may be that the present invention permits the use of a very large frame size of arrangement of encoding elements, possibly of the same order as the length of the message and optionally larger than the length of the message. Not only may the arrangement of encoding elements have a reconfigurable frame size, but it may also be that the number, function and interrelationship of individual encoding elements are all fully configurable, optionally being reconfigured each time a new message is to be encoded. Such reconfigurability of all of the frame size of the arrangement of encoding elements and the number, type and interrelationship of each encoding element in the arrangement offers more flexibility and potentially more sophisticated/complex encryption than provided by the certain encryption methods used in the prior art. By way of example, traditional encryption methods of the prior art use fixed arrangements of encoding elements, each element operating on a fixed block of data (being a constant number of units of data) to encrypt a message that is broken down into those fixed blocks. The effective frame size of the encoding element network of such a prior art method is generally smaller than the size of the message to be encrypted, resulting in a repeated action, with multiple blocks of the message being encrypted in a like manner. Using the same, fixed arrangement of encoding elements to encrypt multiple messages, which are broken down into fixed-length blocks of data, and using a relatively small encoding network involving a repeated action reduces the challenge for attackers attempting to analyse and decode encrypted messages.

In an embodiment of the invention, the units of data may be bytes. Alternatively the units of data may be ASCII characters, bits, hexadecimals or any other size.

In an embodiment of the invention, the step of configuring the arrangement may be performed such that its frame size is greater than a fraction of the number of units of data in the series. Preferably, the fraction will be greater than 0.1, and preferably greater than 0.3. It is preferred that the fraction is greater than 0.5, so that at least one unit of data passes through the arrangement in a manner that is different from all other units of data that pass through the arrangement. In an alternative embodiment of the invention, the step of configuring the arrangement may be performed such that its frame size is greater than the number of units of data in the series. This ensures that the processing of each individual unit of data is unique, and that no single unit of data passes through the arrangement and is processed in the same way as another unit of data of the given message. It will be understood that the processing undergone by one unit of data may nevertheless be the same or equivalent to the processing undergone by another unit of data, but with the paths taken by the units of data being different. With no one portion of data (the portion being a series of multiple units of data being a part only of a larger message) being processed in the same way, there is no repetition of processing that can be utilised by an attacker to analyse an encoded message, to decode the message in whole or in part.

In an embodiment of the invention, the given size of the message is a pre-set maximum size, such that the number of units of data in the message received is guaranteed to be less than a pre-set maximum size. The message may be split into parts, with each part having a size less than the pre-set maximum size. The arrangement of encoding elements may be dynamically configured to have a frame size greater than the number of units of data in a given message. Advantageously, dynamically configuring the encoding elements may prevent the frame size from being larger than necessary for a given message, minimising the computing power and degree of complexity required for encryption.

In an embodiment of the invention, the method of encoding may be repeated for multiple different messages, and the arrangement of encoding elements may be reconfigured in respect of each such message. Advantageously, reconfiguring the arrangement for each message adds an additional layer of security, preventing attackers from assuming a fixed pattern of encoding elements.

In an embodiment of the invention, the arrangement of encoding elements may be reconfigured dynamically during the encoding of any given message. This adds further security to the message, preventing an attacker from predicting the pattern of encoding elements.

It may be that the arrangement of encoding elements are in the form of a directed graph, including at least some paths through the graph where multiple encoding elements are configured in series. Additionally, or alternatively, it may be that the arrangement of encoding elements are in the form of a directed graph, including at least some paths through the graph where multiple encoding elements are configured in parallel. In an embodiment of the invention, the arrangement of encoding elements may be in the form of a directed graph, including at least some paths through the network where multiple encoding elements are configured in series, and at least some paths through the directed graph where multiple encoding elements are configured in parallel. In a preferred embodiment, the method of configuring encoding elements may promote parallel arrangements, improving computational efficiency of the directed graph.

It may be that the arrangement of encoding elements comprises two or more sub-graphs (or sub-networks), each such sub-graph (sub-network) being in the form of two or more encoding elements, each sub-graph being nested within a larger graph or sub-graph.

The arrangement of encoding elements may comprise two or more sub-graphs (or sub-networks), each such sub-graph (sub-network) being in the form of two or more encoding elements. It may be that an encoding element or a sub-network of encoding elements has a frame size being a first number and a different encoding element or sub-network of encoding elements has a frame size being a second number. The first number may be different from the second number. It may be that there is at least one prime factor of one of the first and second numbers that is not a prime factor of the other of the first and second numbers. It may be that there is at least one prime factor of the first number that is not a prime factor of the second number and there is at least one prime factor of the second number that is not a prime factor of the first number. There may be a third encoding element or sub-network of encoding elements having a frame size being a third number which has a prime factor which is not a prime factor of either of the first and second numbers. It may that the prime factors of each of the first, second and third numbers each comprise at least one prime factor that is not a prime factor of the other two numbers. There may be a fourth encoding element or sub-network of encoding elements having a frame size being a fourth number which has a prime factor which is not a prime factor of any of the first to third numbers. It may be that the prime factors of each of the first, second, third and fourth numbers each comprise at least one prime factor that is not a prime factor of the other three numbers. It may be that the lowest common multiple ("LCM") of the first, second, third and fourth numbers is greater than 200. Having multiple encoding elements, and/or multiple sub-graphs of encoding elements, each having different frame sizes that yield a high LCM may promote larger drift of units of data, within the message, when the message is being encoded.

An arrangement in which the frame size of different parts of the arrangement differ in this way means that data units are not handled in fixed-length portions of data (i.e. having a fixed number of units of data in the portion). A unit or portion of data in the uncoded message that corresponds to a unit or portion in the encoded message may thus have a very different position in the message. With the use of encoding elements which individually or collectively operate on sub-frames of data having different sizes, the lowest common multiple of the sub-frame sizes being larger than the largest sub-frame size, units of data may bleed between (or drift between) sub-frames, as the varying-sized sub-frames of data pass through the arrangement. The data may thus be more mixed up—with the relative position(s) in the message of one or more units of data in the encoded message, being very different from the corresponding position(s) in the original uncoded message of the one or more corresponding units of data. It could be said that the entropy of the message is increased, or that greater disorder or greater randomness is introduced.

In an embodiment of the invention, each encoding element may be provided by a computer. At least one computer may perform the processing of a unit of data by one encoding element, and may be different from another computer performing the processing of a unit of data by a different encoding element. Processing of units of data may be performed using multiple computers for parallel processing, with each computer processing a unit of data by a different encoding element.

In an embodiment of the invention, each encoding element may perform a transformation on each unit of data it receives. The transformation may be a mathematical bijection, which can be in inverted in order to decode the unit of data.

In an embodiment of the invention, at least one of the encoding elements may be arranged to process units of data by substituting each unit of data with a replacement unit of data, by means of a mapping function, for example a substitution.

In an embodiment of the invention, at least one of the encoding elements may be arranged to process units of data by receiving multiple units of data as a set, and then replacing the units of data in the set with a different set, as a reversible transformation. For example, an encoding element may act as a fixed cipher, receiving multiple units of data as a set in a given order, and then placing the units of data in the set in a different order. It may be that at least one of the encoding elements is arranged to receive a first number of units of data and transform the data such that a second number of units of data is outputted, the second number being different from the first number.

In an embodiment of the invention, the arrangement of encoding elements may be in the form of a directed graph, including at least some paths through the directed graph where multiple encoding elements are configured in parallel, and including at least one node, which delivers sets of data to different branches of the directed graph which are arranged in parallel. Data may be delivered in a round-robin fashion to each branch in accordance with a predetermined sequence. For example, data may be delivered in a round-robin fashion to each branch. Data may be delivered in a sequence to each branch which depends on the frame size of the branch. It may be that data is delivered in a sequence such that the number of units of data sent to each branch in turn being fixed but independent of the frame size of the branch. It may be that data is delivered in a sequence such that the $i_{th}$ unit of data is delivered to branch $m_i$, where $m_i$ is a pseudorandom sequence of numbers. Alternatively $m_i$ may be a finite sequence of numbers that repeats. The number of numbers in the finite sequence is preferably different from the number of branches from the node. A node that delivers data to branches in a network for encoding data may have a corresponding node that receives data from a corresponding branch in the corresponding network for decoding the encoded data. Similarly, a node that collects data from branches in a network for encoding data may have a corresponding node that sends data to a corresponding branch in the corresponding network for decoding the encoded data. The node which collects data from parallel branches (i.e. sub-branches) that corresponds to a node (upstream) which delivers data to the parallel branches of a sub-graph preferably collects successive units of data from branches in a sequence that corresponds to the sequence in which units of data are delivered by the upstream node to the branches.

In an embodiment of the invention, the step of configuring the encoding elements in the arrangement may include generating a descriptor which uniquely defines the arrangement. In encryption methods of the prior art, a key system is used to enable an encoded message to be decoded. Such a key system (of the prior art) may include the use of a public key, a private key, and a known cryptography system with public encryption and decryption algorithm. Only the private key is unknown in such prior art systems, possibly leaving the systems vulnerable to attack. The present invention enables the implementation of a cryptography system that does not use such a private or public key, but instead relies on the use of a descriptor. It may be that, without the knowledge of the secret descriptor, the encoded message is impossible to decode. It may be that even with the knowledge of the descriptor, the encoded message is impossible to decode because the means of converting between the descriptor and the decoding arrangement is not known by the unintended recipient. Certain embodiments of the invention may thus be described as keyless cryptography.

In the context of certain embodiments of the present invention the descriptor may define both the size and shape of the arrangement. The descriptor may define the type of each individual encoding element within the arrangement. The descriptor may define the interrelationship between individual encoding elements within the arrangement. The descriptor may define the configuration parameters associated with each individual encoding element within the arrangement. The descriptor may also define any dynamic changes to the arrangement of encoding elements that may occur during the encoding of a given message. The descriptor may be represented by a computer language which uniquely defines the arrangement, and the computer language may be converted into a code, for example a single number. It may be that the descriptor is a number, such that each different arrangement is defined by a unique number. It may be that the descriptor is a number, such that each different arrangement is defined by a unique number. In the case where the descriptor is a number it may be that there is a set of numbers (which may be finite or countably infinite) where each number in the set corresponds to a different arrangement of encoding elements. It may be possible for the arrangement of encoding elements to be defined by a random number generator.

In an embodiment of the invention, the step of configuring the encoding elements in the arrangement may include interpreting a descriptor. There may be a step of converting from a descriptor to the arrangement of encoding elements. There may be a step of converting from the arrangement of encoding elements to a descriptor.

There may be certain embodiments in which the relationship between the descriptor and the configuration is private, such that it is known between the parties sending and receiving the message, but not known any other party. There may be various embodiments in which the relationship between the descriptor and the configuration is different, which may be of use for example where two or more different enterprises are using embodiments of the invention and each wishes to have a system in which relationship is private and unique to their own system. There may be certain embodiments in which the relationship between the descriptor and the configuration is not secret, such that only the descriptor is kept private, not the relationship. Such embodiments may be useful where an enterprise wishes to communicate with multiple unconnected third parties. For example, a bank may freely make available hardware and/or software to all customers which can encode/decode messages between the bank and a given customer (when configured in accordance with a descriptor that is private as between the bank and that particular customer, but no attempt is made to keep the software secret). The descriptor may also be private, and may itself be encrypted. The descriptor may be provided as a data product, for example being provided on a computer-readable medium.

The conversion from a particular arrangement of encoding/decoding elements and the corresponding descriptor may be performed by a compiler, for example in the form of a computer-implemented computer program. The conversion from a descriptor to the corresponding arrangement of encoding/decoding elements may be performed by a decompiler, for example in the form of a computer-implemented computer program. According to certain aspects of the invention, there is provided a computer program product configured to cause, when the computer program is executed on a computer, conversion between (i) a particular an arrangement of encoding/decoding elements for use in an encoding/decoding method according to any aspect of the invention as described or claimed herein and (ii) the corresponding descriptor that uniquely defines that arrangement.

There is also provided a machine implemented method (for example implement by means of a computer) of decoding data previous encoded by any aspect of the present invention as described or claimed herein is also provided.

The encoded message may be provided as a data product, for example being provided on a computer-readable medium.

According to a further aspect of the invention, there is also provided a data processing apparatus for performing the methods as outlined above. The data processing apparatus may comprise multiple reconfigurable encoding elements. At least some of the multiple reconfigurable encoding elements may be provided by means of a programmed computer. Optionally, at least some of the reconfigurable encoding elements may be provided as software modules and at least some of the reconfigurable encoding elements may be implemented in hardware.

In a related aspect of the invention, there is provided a machine-implemented method of encoding data, wherein the method comprises a step of receiving a message, the message being represented by a series of units of data, a step of configuring multiple encoding elements in an arrangement, and a step of encoding the message by passing each unit of data through the arrangement so that each unit is processed by at least one of the encoding elements. The configuring of the arrangement defines how each unit of data is processed by the encoding elements. The arrangement may be configurable to generate an arrangement having a pre-selected frame size. It may be that the arrangement is configurable to generate a frame size that is greater than 1,000. It may be that the arrangement is configurable to generate a frame size that is greater than 10,000, for example 30,300 or greater (30,300=2×3×5×7×11×13). The arrangement may be configurable to generate an arrangement having a pre-selected complexity. The complexity of the arrangement may simply be a measure of how many encoding elements are provided in the network. Alternatively, the complexity of the arrangement may be a parameter that defines how complicated a network is for a given frame size. The complexity of the arrangement may, in a simple case where the number of units of data is the same in the encoded and the decoded message, be defined as $1/F\Sigma_{i=1}^{F}O_{u_i}$, where F is the frame size of the arrangement and $O_{u_i}$ is the number of operations that the $i_{th}$ unit of data, $u_i$ undergoes as is passes through the network. Using such a definition, the total number of transformations performed on the units of data of a message as the units pass through a network will be the same (or substantially the same) as between networks having the same complexity, but with different frame sizes (provided that the number of units of data is larger than frame sizes of both the networks). The frame size and/or complexity of the network may be chosen according to the particular needs of the user(s). For example, a highly sensitive message not being time-critical may be best encoded by an arrangement having both a large frame size and a high complexity. Alternatively, a highly sensitive and time-critical message may be best encoded by an arrangement having a frame size larger than the message length but of lower complexity. Where the environment is such that messages are typically short and computing/processing power is limited (for example when sending text messages over a cellular telecoms network between two mobile devices) both frame size and complexity may be relatively small yet still provide better than adequate encryption.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

In crypto-analysis it is generally assumed that an attacker will know how the encoder they are analysing works, and, that a "key" is the only unknown element protecting the message. This is because there is a relatively small number of ciphers, they are all well known, and, all these ciphers work in a fixed way. These ciphers perform a fixed set of processing steps using a fixed "block" size, applying the same cryptographic key in the same way throughout a stream of bytes, block by block. Knowing how a cipher works is an advantage to an attacker.

Figure 2:
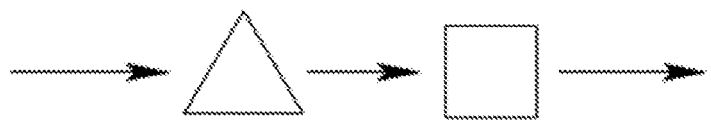
FIG. 2 shows two such encoding elements arranged in series
Figure 3:
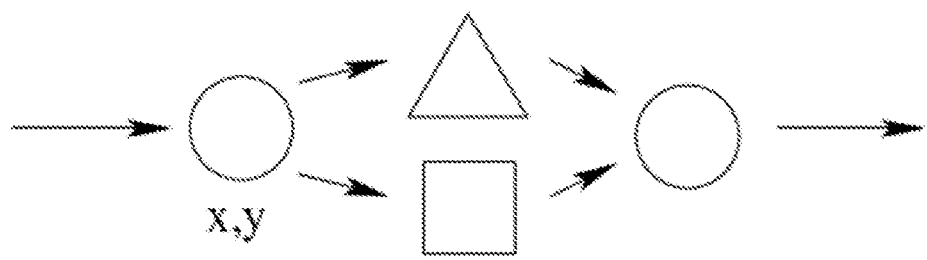
FIG. 3 shows two such encoding elements arranged in parallel
Figure 4:
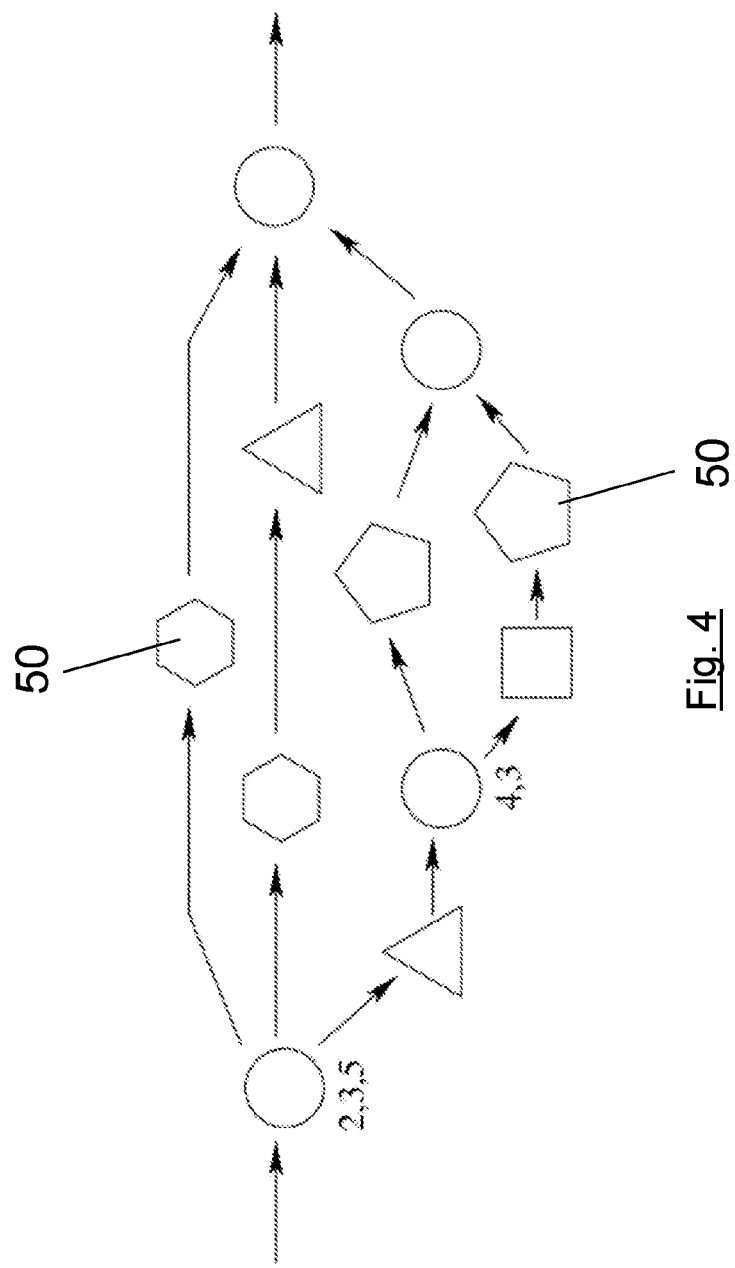
FIG. 4 shows a network of encoding elements nested in series and in parallel according to a first embodiment of the invention.

To overcome this there is proposed, in accordance with a first embodiment of the present invention, a configurable digit-wise "encoding machine" (or "encoding engine"), the machine being dynamically constructed at runtime, the machine being comprised of a configurable network of configurable encoding elements. One such encoding element is shown schematically in FIG. 1. The encoding elements may be arranged in serial sub-groups (such as shown in FIG. 2), in parallel sub-groups (such as shown in FIG. 3), and/or nested in any combination of serial or parallel sub-groups to any depth. An example of a compound encoding machine made from many encoding elements nested in series and in parallel to form a network of such elements as is shown in FIG. 4. It will be seen from FIGS. 1 to 4, that relatively complex encoding machines may be built by combining encoding elements in series and parallel.

Figure 1:
FIG. 1 shows a single encoding element for use in a first embodiment of the invention.

FIG. 1 shows a triangle representing a single encoding element. The left most arrow represents the supply of a sequence of digits into the encoding element. The right most arrow represents the sequence of digits emerging from the encoding element after having been processed by it.

FIG. 2 shows a triangle and a square representing two distinct encoding elements forming a compound serial group of encoding elements. The input digits are passed to first (triangular) encoding element in the group. Then the first encoding element encodes the input digits and passes them as input to the next (square) encoding element in the group. The output of the compound serial group of encoding elements is the output of the final encoding element in the group.

FIG. 3 shows a triangle and a square representing two distinct encoding elements and two circles representing branch and join nodes on entry and exit to the network in the form of a directed graph. Together these form a compound parallel group. The input digits are broken into sets of x and y number of digits by the branch node. The first x number of digits are passed by the branch node to the first (triangular) encoding element. The next y number of digits are passed by the branch node to the second (square) encoding element. Subsequent sets of x and y digits are passed in turn repeatedly to the encoding elements within the compound parallel group until the input is exhausted. The output of the compound parallel group is constructed by taking the first x number of output digits from the first (triangular) encoding element followed by y number of output digits from the second (square) encoding element and so on. Note that x and y are independent of the natural frame sizes of the sub-networks.

FIG. 4 shows an encoding machine according to the first embodiment. FIG. 4 shows a number of regular polygons representing distinct encoding elements 50, circles representing branch and join nodes in the directed graph, and arrows representing the direction of flow of the sequence of input digits through the directed graph. It will be appreciated that this is just one example of how a machine might be configured. Only a small number of encoding elements networked in serial and parallel groups need to be combined to build a compound encoding machine of considerable complexity.

When employing an encoding machine to encode a message, the message to be encoded is broken into a sequence of digits (of appropriate base). These digits are passed through a directed graph, or network, of encoding elements, which together form an encoding machine (such as that shown in FIG. 4). Each encoding element processes its input digits according to its type and configuration and passes the resulting digits to the next node in the network. Each encoding element processes a number of digits at a time. The number of digits processed each time is called the "frame" size of the encoding element. For example, an individual encoding element could process ternary digits by (a) simply substituting digits from 0 to 1, 1 to 2, or, 2 to 0, (b) reorder digits, or (c) collect a number of digits together and process them as a unit. Whilst Base 3 is given here as an example it will be appreciated that the base used in embodiments may be different, for example the digits may be represented in binary (base 2), decimal (base 10), hexadecimal (base 16), or a higher base, depending on the particular requirements of the embedment concerned.

Two instances of the same class of encoding element could exist within the same network but have independent configurations meaning that they perform similar but different changes to their input. Branch nodes within the network direct sets of digits through their sub-branches in turn. Each sub-branch is configured with a number of digits to receive each turn. Join nodes recombine multiple sequences of digits into a single sequence by drawing from their sub-branches in the same proportion as their equivalent branching node issued to each sub-branch. A sub-branch can have sub-branches of its own nesting to any depth. The arrangement of encoding elements into serial groups of encoding elements, parallel groups of encoding elements, or a nested combination of any of these, is entirely controlled by the encoding network configuration in the form of an encoding network description allowing the encoding network to behave differently each time its configuration is changed.

Each encoding element in the network performs a specific kind of transformation to its input digits and the transformation is controlled further by its configuration. There are three general classes of encoding element transformation, each creating a number of possibilities.

The first class involves changes to digit position within a frame. Here digits in the input frame are rearranged into a different order. These include (but are not limited to): a simple rotation of the digits around the frame, movement of a digit in one position to a new position, the new position being calculated using a mathematical bijection.

The second class of encoding element involves digit-wise substitution of digit values within a frame. Here individual digits are replaced with new values based on a calculation. These include (but are not limited to): replacement of an existing digit by applying a mask (for example, XOR), replacement of an existing digit with a value being calculated using a mathematical bijection, and replacement of an existing digit with its modular inverse.

The third class of encoding element involves frame-wise substitution of digit values. Here the whole frame of digits is replaced with different digits. These include (but are not limited to): a mathematical bijection calculating a new set of frame digits to replace the original, replacement of the existing digits with new digits from a look-up table, applying a traditional fixed cipher at this node.

Compound groups of encoding elements will have a natural frame size, which depends on the nature and topology of its component elements. For example sub-graphs of encoding elements (that is a network of encoding elements that form a part only of the larger directed graph of elements) will have a natural frame size. Consider, for example, an encoding element which reads in sets of 7 digits and then, for each set, outputs the last 5 digits it read followed by the first 2 digits it read. In this case, the natural frame size of this encoding element is 7 digits; under normal operation, it needs 7 digits to be input before it can issue digits to its output. This is equivalent to a 2-digit forward rotation of a 7-digit frame. Consider also a second encoding element which reads in sets of 5 digits and then, for each set, outputs the last 4 digits followed by the first digit. This is equivalent to a single-digit forward rotation of a 5-digit frame. A compound serial group of the first encoding element followed by the second (see FIG. 2) would have a combined natural frame size of 7×5=35 digits. That is, a sequence of 35 digits would cause the first encoding element to process 5 complete 7-digit frames and the second encoding element would process 7 complete 5-digit frames. After the 7th digit enters the first encoding element, the digits are reordered, and, all 7 digits are sent to the second encoding element. The second encoding element immediately processes the first 5 digits and outputs them. The remaining 2 digits are held until 3 more are supplied (to make a frame of 5), or the network is flushed. The numbers 7 and 5 are co-prime, so (if not flushed) at no point before the 35th digit would both of the pair of these serially arranged encoding elements be empty of digits. Hence, the natural frame size of a set of encoding elements in series is the least common multiple of the frames sizes of the constituent encoding elements.

$$\text{SerialNaturalFrameSize}(x_0, x_1, \ldots, x_n) = LCM(x_0, x_1, \ldots, x_n)$$

where $x_i$ is the natural frame size of a constituent encoding element.

A compound parallel group of the first encoding element followed by the second (see FIG. 3) would have a combined natural frame size of 7+5=12 digits. That is, a sequence of 12 digits would cause the first encoding element to process one complete frame and the second encoding element to process one complete frame. The natural frame size of a set of encoding elements in parallel is the sum of the frame sizes of the constituent encoding elements.

$$\text{ParallelNaturalFrameSize}(x_0, x_1, \ldots, x_n) = \Sigma_{i=0}^{n} x_i$$

where $x_i$ is the natural frame size of a constituent encoding element.

It may be that a compound group of encoding elements, for example a sub-graph of encoding elements, is assigned a frame size that is less than its natural frame size. In this case, when the amount of data to be processed by the compound group of encoding elements reaches the assigned frame size a flush function is performed, for example with the group of encoding elements effectively resetting to be ready for more data.

The effective frame size of an entire network of sub-networks of encoding elements can be calculated using the equations above, optionally taking into account, if appropriate, any frame sizes assigned to particular groups of encoding elements.

The number of digits supplied to a sub-branch by a branch node need not be related to the sub-branch's natural frame size. It could be considered an advantage for the number of digits supplied to a sub-branch to differ to the natural frame size of the sub-branch as this would increase complexity.

The encoding network may be as complex as the circumstances require. The compound natural frame size of a network is not the only component of the complexity of an encoding engine. The complexity of a given encoding element also includes the complexity of the transformation it performs. This can be weighted proportionally to the type of encoding element or the number of ways it can be configured. The complexity of a given encoding element is therefore the product of its natural length and the type weighting. The complexity of a compound network is calculated as the product of the complexities of the constituent encoding elements.

The natural frame size of a complicated network of encoding elements may be large. A sequence of (8 bit) bytes will not always align with arbitrarily-sized frames of any given numeric base. In such cases, it is necessary to be able to flush the digits currently in the network all the way through to the output. This means that each encoding element must be able to process a partial frame. Given the potential to build giant networks of encoding elements, it is possible that the natural frame size of a network of encoding elements could exceed the length of a message. It may be considered desirable to have a compound natural frame size sufficiently large that no two parts of a message would be encoded in the same way.

A message once encoded (for example by the encoding network shown in FIG. 4) may then be communicated to the intended recipient, possibly across a public communications network. The encoded message, once received, is decoded by constructing a decoding machine, having decoding elements arranged in a network that corresponds to the encoding machine network. Each encoding element has a corresponding decoding element that reverses the operation effected by the encoding element. The unique description of the encoding element has a corresponding unique description of the decoding element. The arrangement of the decoding elements is a network that corresponds to the network of encoding elements, but having a combined inverse effect. It will be appreciated that the inverse of an arrangement of encoding elements (i.e. an reverse arrangement of corresponding decoding elements) may itself be considered an encoding element. Thus, if two parties each have an arrangement encoding/decoding elements, each arrangement being the inverse of the other, either party may encode a message with their own arrangement to produce an encoded message that can be decoded with the other party's arrangement.

Each unique encoding machine, defined by a particular network of encoding elements, corresponds to a unique natural number as a one-to-one mapping, as will now be explained. The configuration for each individual encoding element in a network is a set of natural numbers, each of which falls within its own range. The type of the encoding element can also be represented by a natural number, there being a finite number of types. Call these parameters $p_0, p_1, p_2, \ldots p_n$ and the size of each range $r_0, r_1, r_2, \ldots r_n$ one for each parameter. Let $p_0$ represent the type of encoding element. Range $r_0$ is fixed and known in advance and is related to the number of possible types of encoding element. The ranges, $r_1, r_2, \ldots r_n$, of the parameters $p_1, p_2, \ldots p_n$ associated with a given type of encoding element are fixed and known in advance, and differ according to the type of encoding element. Thus, once the type of an encoding element is known (value $p_0$), the ranges, $r_1, r_2, \ldots r_n$, of the parameters $p_1, p_2, \ldots p_n$ associated with that type of encoding element can be ascertained by use of a look-up table. A single number is constructed to represent an encoding element and its entire set of configuration parameters by using a successive multiply and add strategy. To calculate the single number p representing a single encoding element configuration consider each parameter in turn starting from the last and working to the front of the list. Start with the value of the last parameter $p=p_n$. If there is a parameter before this then multiply the current value of p by the range size of the next parameter considered $r_{n-1}$ and add its parameter value $p_{n-1}$. With two parameters so far, p is $$p = p_n r_{n-1} + p_{n-1}$$

Continue with successive parameters multiplying by the range and adding the parameter. In general the value of p is $$p = ( \ldots (p_n r_{n-1} + p_{n-1}) r_{n-2} + p_{n-2} \ldots ) r_0 + p_0$$

To reconstruct the list of parameters from a single number we do the reverse. The first parameter has value $p_0 = p \bmod r_0$ (i.e. the remainder left when dividing p by $r_0$). Knowing parameter $p_0$ enables the type of encoding element to be determined and enables the identities of the ranges, $r_1, r_2, \ldots r_n$, of the parameters $p_1, p_2, \ldots p_n$ to be ascertained (from a look-up table using parameter $p_0$ as an index). The remaining parameter values can be deduced successively in the same way as described above. Thus, p is adjusted by taking away $p_0$ and then dividing by the range $r_0$, so that $p_1$ can be ascertained by then calculated p mod $r_1$. Similarly a sequence of encoding elements can be represented by a single natural number, sub-branches can be represented by a single natural number, and entire networks of encoding elements can be represented by a single natural number.

As mentioned above, a message once encoded may be communicated to the intended recipient across a public communications network. The sender and recipient need to have agreed in advance the encoding machine configuration. Existing key agreement protocols allow two parties to agree a shared secret without a third-party (who is able to observe the communication) able to deduce the secret. Here the secret is just a set of byte values which can be interpreted as a single very large natural number. This large secret number can be considered as a candidate encoding machine configuration. The resulting complexity of and encoding machine built from the large secret number can be checked against complexity requirements, either a minimum complexity threshold (for security) or maximum complexity threshold (for performance). Traditional certificates can be used to verify that each party is who they say they are to avoid a man-in-the-middle attack. Hence two parties can agree a different encoding machine configuration each time they communicate.

There now follows a description of a "configuration description language". Although there is, in accordance with the first embodiment, a direct mapping between an encoding machine configuration and a single natural number, it may be desirable to be able to express a given configuration in a more human-readable way. As such, the first embodiment also provides a network encoding machine description language and corresponding syntax. By way of example the network shown in FIG. 4 can be represented in such a language. Suppose the transformations in this network were called the first three letters of the shape of the polygon shown, then the syntax to describe this network is:

```
=> {
     2 hex( ),
     3 hex( ) => tri( ),
     5 tri( ) => {
                   4 pen( ),
                   3 squ( ) => pen( )
                 }
   } =>
```

Where the brackets "( )" surround specific configuration parameters (none shown here), the brackets "{ }" surround parallel compound sub-branches and the symbol "=>" shows the flow of digits between encoding elements and sub-branches serially. Here we do not state what the transformations named tri, squ, pen, and hex actually do.

To summarise the operation of the first embodiment, an encoding machine is generated in accordance with a pre-agreed and secret one-off configuration of an encoding machine as shown in FIG. 4, there being a network of encoding elements each element having a given frame size. The network has a frame size that can be calculated from the individual frame sizes of the individual elements and their arrangement. An incoming message, is broken down into a series of digits. The number of digits in the series can be smaller than the frame-size of the network. The series of digits pass through the network, the route through the network being determined by the position of the digit in the series, as certain groups of data are delivered to different sub-braches by nodes in the network. Each encoding element performs a reversible transformation on one or more digits before passing those digits on to the next part of the network. The encoded message is collected at the termination end of the encoding machine and can then be transmitted to the recipient. The recipient can decode the encoded message by passing the encoded message through a decoding machine, derivable from the pre-agreed secret configuration of the encoding machine. Subsequent messages are encoded using a different configuration.

The encoding machine of the first embodiment has several advantages, as will now be explained. The encoding machine is able to encode a message using a different configuration each time it is run, meaning that an attacker will not be able to assume a fixed set of processing steps is used when encoding multiple messages. The number and complexity of available ciphers is unlimited. Any given encoding machine's complexity can be configured on the basis of adjustable parameters such as the number of kinds of encoding elements it uses, the number of ways these encoding elements could be arranged, the number of ways in which each encoding element could be configured. The number of kinds of encoding elements can be extended or restricted to different audiences. The network shape of the encoding machine naturally promotes parallel processing which eliminates the cost of the increased complexity achieved. The natural frame size of a multiply-nested compound group of encoding elements could exceed the length of the message to encode. This means that the message is not broken into sets of blocks with each block being processed in the same way. Instead, there is no repeated action in the encoder making it harder to analyse an encoded message. Existing key agreement protocols and certificate authentication techniques can be used to construct a shared secret which, if interpreted as a single natural number, can be used to map directly to a network encoding machine description language configuration of an encoding machine. This makes it possible to construct a different crypto-system for every message sent. The complexity of a multiply-nested compound group of encoding elements could be used to determine whether sufficient or too much complexity for a given agreed configuration. Specific and dedicated hardware circuitry may be used to increase the performance of the individual encoding element implementations to allow an overall increase in performance compared to an implementation solely in software. Such hardware is most suitable between local and remote networks to provide transparent security to the user. An encoding machine could be spread over a number of multi-processor computers working together to increase the complexity of the encoding.

It is the inventor's belief that the ability to deploy an ad-hoc novel crypto-system, on a per message basis, will revolutionise the world of cryptography, in that no-one will ever want to use a fixed-era cipher again. A person or device will be able to establish a shared secret with a second party via a connected or connectionless protocol and use the shared secret as an encoding machine configuration known only to the two agreeing parties. The only attack-routes for an eavesdropper will be the agreement protocol or exhaustive search of every possible encoding machine configuration (which is infinite). The present embodiment devises ways to agree and configure bespoke crypto-systems to thwart the attempts of eavesdroppers. The present embodiment creates the concept of a dynamic cipher and in so doing brings to an end the era of fixed ciphers. The present embodiment encodes messages in a completely new way. The present embodiment dispenses with restrictive concepts such as "fixed block size" and "fixed transformations" and in so doing increases complexity significantly. It is believed that there are prejudices and preconceptions in the art of cryptography in that the common way of improving cryptography would be to add more rounds to an existing process or perhaps tweak a transformation slightly.

There are multiple ways in which the present embodiment may be put to use. The Data Protection Act places a burden on every organisation which holds data about people to protect that data. National governments seek to withhold certain information from their enemies, allies, and citizens. Individuals wish to protect their personal information, financial information, and communications to prevent theft or embarrassment. The present embodiment can be used to protect data in motion or at rest, both of which are applicable to everyone.

The present embodiment may be effected solely in software. Alternatively, the benefit of the present embodiment may be achieved through the construction of dedicated communication network hardware which implements the networks of encoding elements in circuitry. Hence, whilst the invention may be implemented in software, it provides a significant technical contribution over and above that.

To summarise, the first embodiment concerns a dynamically constructed, configurable, digit-wise encoding machine which rewrites a message. The encoding machine is comprised of a configurable network of distinct encoding elements (shown as regular polygons in FIG. 4), each with its own action and configuration. Branch and join nodes (shown as circles) create different paths through the network. Input digits pass through the network from one encoding element to the next. Each encoding element rewrites and forwards its input digits according to its type and configuration. Encoding elements can be arranged in serial or parallel groups in order to generate a complex compound network. The number of possible configurations is limitless. When the encoding machine configuration is unknown to an eavesdropper, or includes encoding elements whose configuration can take a cryptographic "key" then the encoding machine as a whole could be regarded as an encryption device. The potential compound effect of an arbitrary, yet very large, network of encoding elements is unfathomable. The precise technical details of every single encoding element in the network, of the first embodiment, are of course crucial to decoding a message encoded by it correctly.

Figure 5:
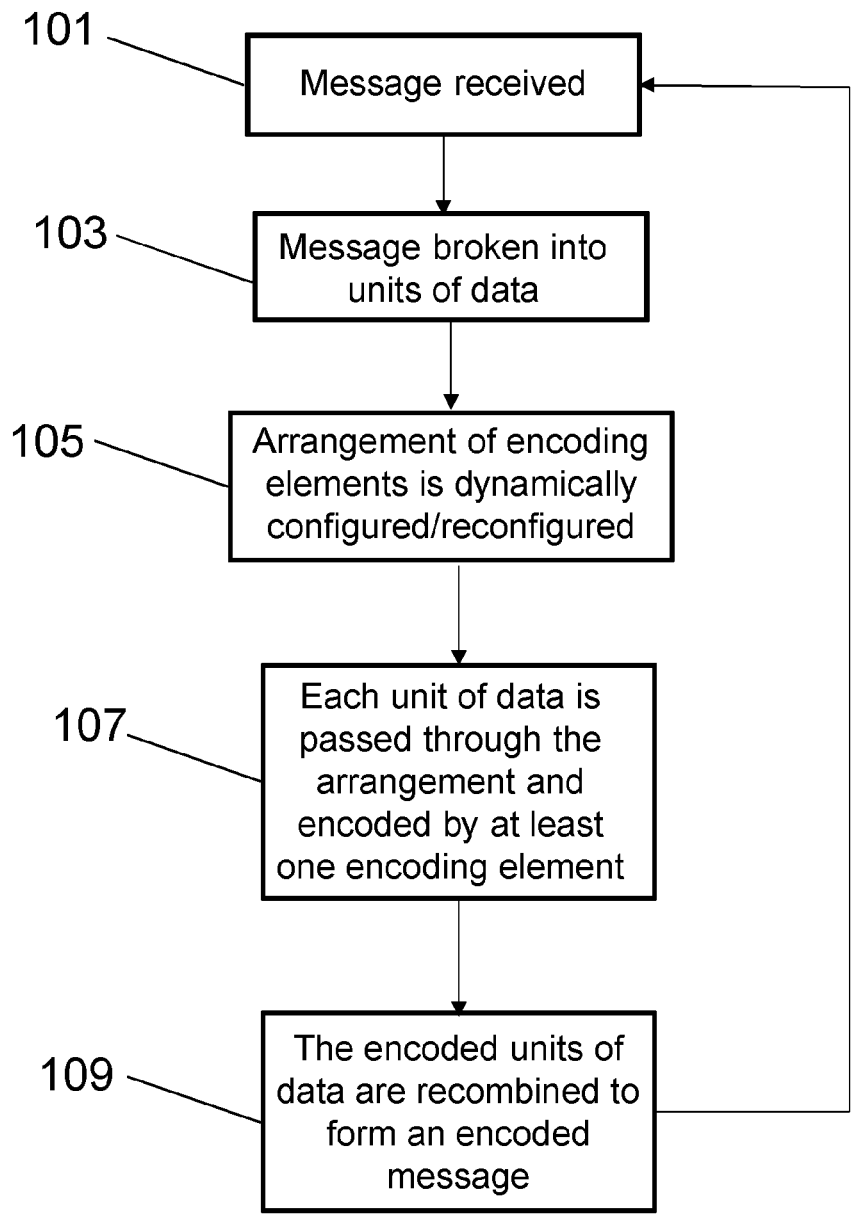
FIG. 5 is a flowchart illustrating a method of encoding data according to a second first embodiment of the invention.

FIG. 5 shows a method of encoding data according to a second example embodiment of the invention. In a first step 101, a message, in the form of a series of units of data is received. This message could be a series of ASCII characters, a series of bytes or any other unit of data. In a second step, 103, the message is broken down into a series of individual units of data, for example, individual ASCII characters. There may be a pre-set maximum size for the length of message that can be received, and this may be set such that when the message is broken down into individual units, the number of individual units does not exceed a pre-set maximum value.

In a third step 105, a plurality of encoding elements are configured to form an arrangement in the form of a network of encoding elements. Some encoding elements are arranged in series and some in parallel.

In a fourth step 107, each individual unit of data will be passed through the arrangement of encoding elements. Each encoding element will perform a transformation on at least one unit of data before passing the encoded unit or units of data along to the next encoding element. The transformation performed by each encoding element will be a bijection, and may be, for example a rotation of individual units of data around a frame, or substitution of units of data by a mapping function. The arrangement of encoding elements may be configured in size and shape such that each individual unit can pass through a different series of transformations without any repetition. Each unit of data will pass through at least one encoding element In a fifth step 109, once each unit of data has passed through each of the encoding elements in its path, the encoded units of data will be recombined to form an encoded message.

Figure 6:
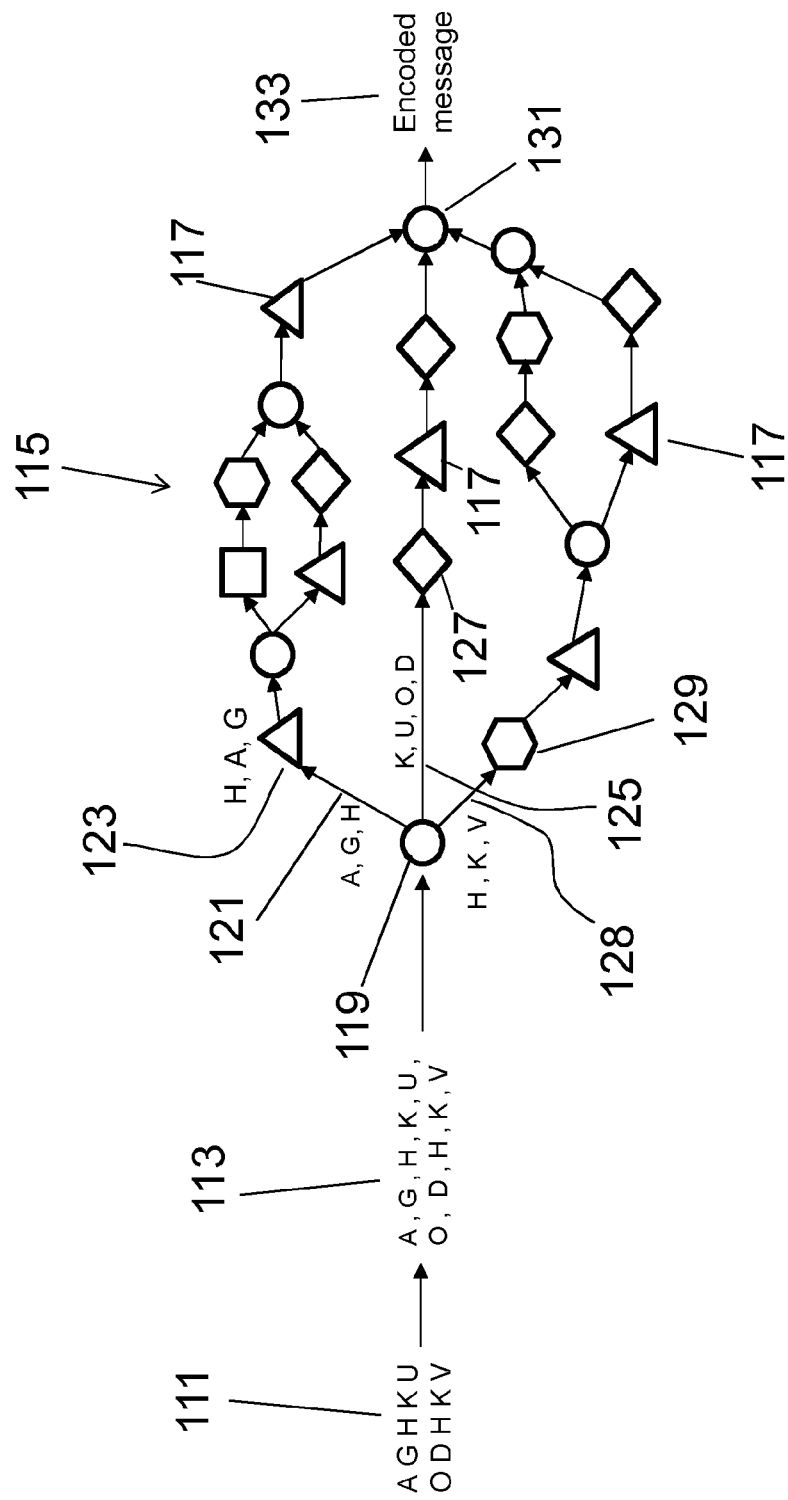
FIG. 6 shows a network of encoding elements nested in series and in parallel according to the second embodiment.

This method may then be repeated. Each time a new message is received and broken up into units of data, a new arrangement of encoding elements may be dynamically configured/reconfigured. This dynamic reconfiguration prevents an attacker from assuming a fixed arrangement of encoding elements, and thus adds an additional layer of security FIG. 6 shows an example implementation of the method of encoding data as described in FIG. 5. The implementation includes an arrangement 115 of multiple differently configured encoding elements 117, which together form an encoding network. A message 111 in the form of a series of ASCII characters (the ten letters "AGHKUODHKV") is received, and is broken down into individual units of data 113 (individual ASCII characters). Each ASCII character 113 then passes into the network 115 of encoding elements 117. In the arrangement 113 shown in FIG. 6, all of the individual units of data 113 are initially passed into a first node 119 (indicated by a circle) and pass in a downstream direction such that the encoding network is in the form of a directed graph. From the first node 119, there are three different paths 121, 125, 128 along which ASCII characters can pass. The node 119 delivers successive units of data to one of the three different paths, selected in accordance with a predetermined sequence, in this case a sub-frame of three units to the first branch 121, then a sub-frame of four units to the second branch 128, then a sub-frame of six units to the third branch 128, and repeating that sequence for each successive group of thirteen units of data.

The first path 121 leads to the triangular encoding element 123. In this example, the triangular encoding element 123 can process three individual ASCII characters 113 at a time, and will apply a bijection transformation to each of the three characters 113 in turn. In the example shown here, the triangular encoding element 123 rotates the three ASCII characters about a frame, such that the sequence A, G, H is transformed to H, A, G. The characters are then distributed to the encoding elements downstream, eventually reaching the last node 131 at the end of the arrangement 115. It will be appreciated that although the first node 119 passes only three units of data to the first branch 121, the sub-network of elements 117 downstream of the first branch 121 has an effective frame size that is greater than three.

As the first node 119 delivers only three units of data 113 at a time along the first path 121, the fourth to seventh units of data in the series ("KUOD") are passed along the second path 125 to a different encoding element 127. In this example, this second encoding element 127 can process four individual ASCII characters at a time. The characters pass via the other encoding elements downstream, which in this second branch are arranged in series, eventually reaching the last node 131 at the end of the arrangement 115.

The remaining three ASCII characters in the message 111 ("HKV") are passed to the third encoding element 129 along the third branch 128. In this case, the third branch expects a sub-frame of data of six units, so the sub-frame of three units of data actually passed on is an incomplete sub-frame. In this situation a flush command is issued by means of a computer-implemented flush token being generated, and passed down the network. The third encoding element 129 receives the incomplete sub-frame of three units of data ("HKV") and, in view of the flush token, performs a reversible process on the three units of data, and then passes the flush token to the next encoding element. (When a node receives a flush token it will pass on multiple flush tokens, one to each sub-branch of the network to which it delivers data.) Each encoding element is similarly configured to perform a reversible process on an incomplete sub-frame of data, in the "flush" situation. For a given encoding element, the process performed on an incomplete sub-frame of data may be different from the standard process that would be performed on a complete sub-frame depending on whether the transformation has meaning for a smaller frame. For example, a simple rotate function (e.g. rotate data within the frame by taking the last unit of data and placing it at the front) has meaning (and is reversible) no matter how many units of data are present in a sub-frame.

Each individual ASCII character 113 passes through and is processed by various encoding elements 117 as the characters travel through the network 115 of encoding elements along a predetermined path, the path being one of the many possible paths as indicated in the arrangement 115 shown in FIG. 6. Within a given arrangement 115, some encoding elements 117 will be arranged in series, whilst others may be arranged in parallel. For example, the sub-network of the third branch 128 includes some elements arranged in series and some arranged in parallel.

The arrangement 115 of individual encoding elements 117 is configured dynamically each time a new message 111 is received. In this embodiment, the arrangement 115 is configured such that the number of available routes for units of data is greater than the number of individual units of data in the message to be encoded. It is also the case in this embodiment, that the frame size of the network is bigger than the length of the message, in that there is no repetition in how units of data are processed as they pass through the network. If the message were larger (or the network less complicated) then there might be (a relatively large number of) subsets of data, where each unit of data in each sub-set is processed in the same way as another unit of data in another sub-set (i.e. passing along the same route through the network and being the same position in each sub-frame of data that is processed along the route). In other embodiments, it may be deemed sufficient that there is at least one unit of data that passes through the network in a unique way, which might be along a route travelled by other units of data, the uniqueness resulting from the combination of positions that that one unit of data occupies in the various sub-frames of data that are processed by the encoding elements along the route taken by the unit of data as it passed through the network.

In this case, as a result of the frame size of the network being greater than the number of units of data in the message, there is no repetition in passing multiple units of data 113 through the exact same series of transformations.

Each of the paths through the network converge at the last node 131. Once each individual unit of data reaches the end of its path it will be passed to the node 131, and the individual, encoded units of data will recombine to form an encoded message 133.

When the next message 111 to be encoded is received, the arrangement 115 of encoding elements 117 is reconfigured. Furthermore, each individual encoding element 117 may be reconfigured, such that it performs a different transformation. In an example embodiment of the invention, the arrangement 115 of encoding elements 117 is configured in accordance with a pre-set descriptor, which uniquely defines the arrangement 115. At least one of the descriptor and the relationship between the descriptor and the configuration, is private and known only between the sender and the receiver of the encoded message. In certain cases, both the descriptor and the relationship between the descriptor and the configuration are private in order to add an additional layer of security.

The receiver of the encoded message generated by the arrangement of encoding elements shown in FIG. 6 can decode the message by performing a decoding operation on the encoded message, essentially be employing an inverse network of decoding elements, which combine to form a decoding network. The decoding network can be created/generated with the knowledge of the descriptor that defined the encoding network and the knowledge of the relationship between the descriptor and the configuration.

The concept of configuring (reconfiguring) a large number of individual encoding elements to produce a directed graph that performs the function of an encryption machine, enables the processing of data performed by individual elements or sub-groups of elements to be performed by separate items of hardware and/or separate resources of computational power. This creates the capability of building an efficient cryptographic device from a giant network of encoding elements.

Figure 7:
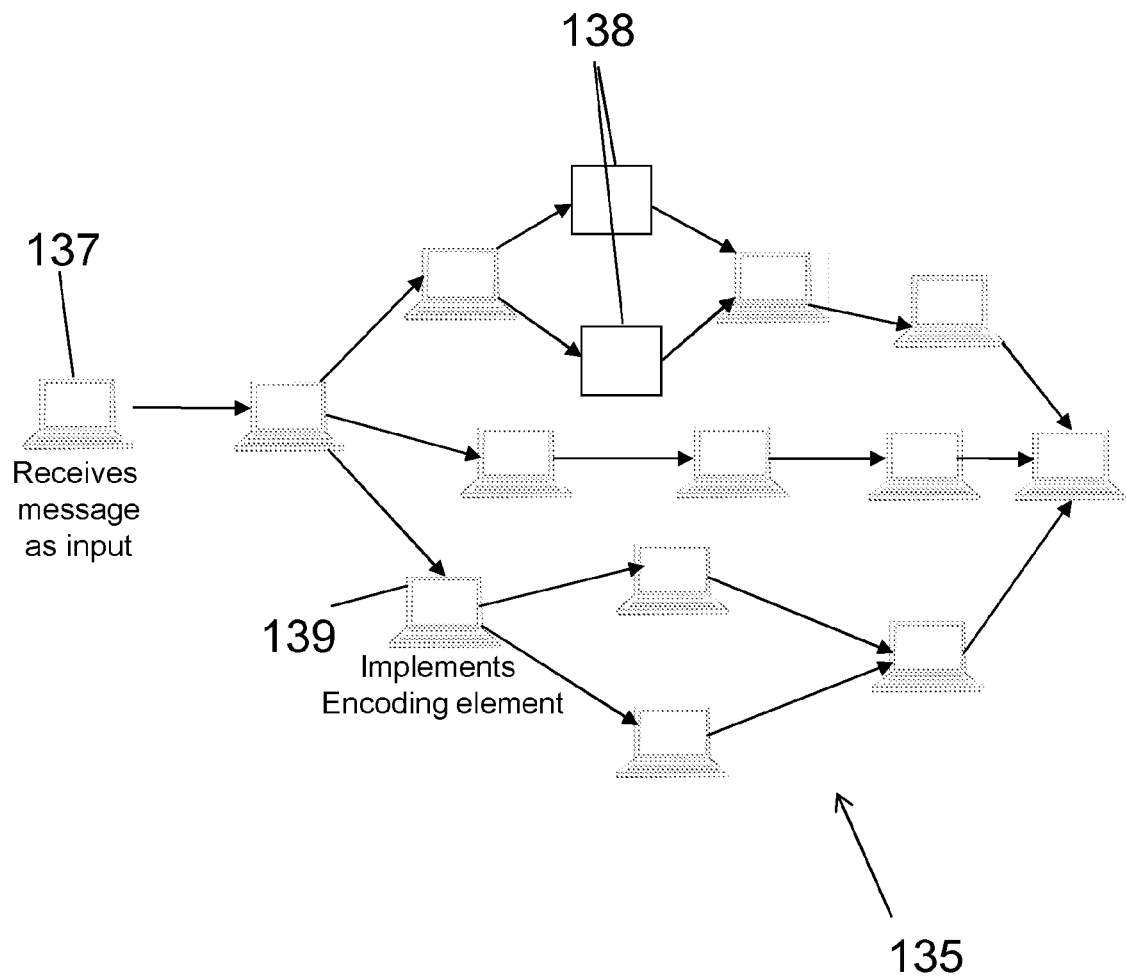
FIG. 7 shows an example computer system used to implement the method of encoding data.

FIG. 7 shows the method of FIG. 5 implemented on a system of hardware elements comprising a network of dedicated electronic circuits 138 of bespoke hardware and suitably programmed computers 139. In an example embodiment of the invention the message is received as an input to a computer 137, which is then passed as a stream of data into the encoding network. Some encoding elements are provided on suitably arranged bespoke circuits 138, which may be able to process data much faster than other encoding elements in the network. The bespoke circuits 138 may be reconfigurable, for example to form the inverse function (so that there are at least two modes, including a decoding mode and an encoding mode). Other encoding elements are provided in software on suitably programmed computers 139. Each computer 139 implementing an encoding element will typically process at least one unit of data each time a message is received (but in certain cases, there may be redundant computers in the network). Some of the computers 139 in network perform the role of multiple encoding elements. It may be that some of the computers 139 have greater processing power available than others, which may be used to advantage when allocating which computer performs the role of which encoding elements. Some or all encoding elements in the network may be reconfigurable to perform any one of many different types of encoding/decoding.

Figure 8:
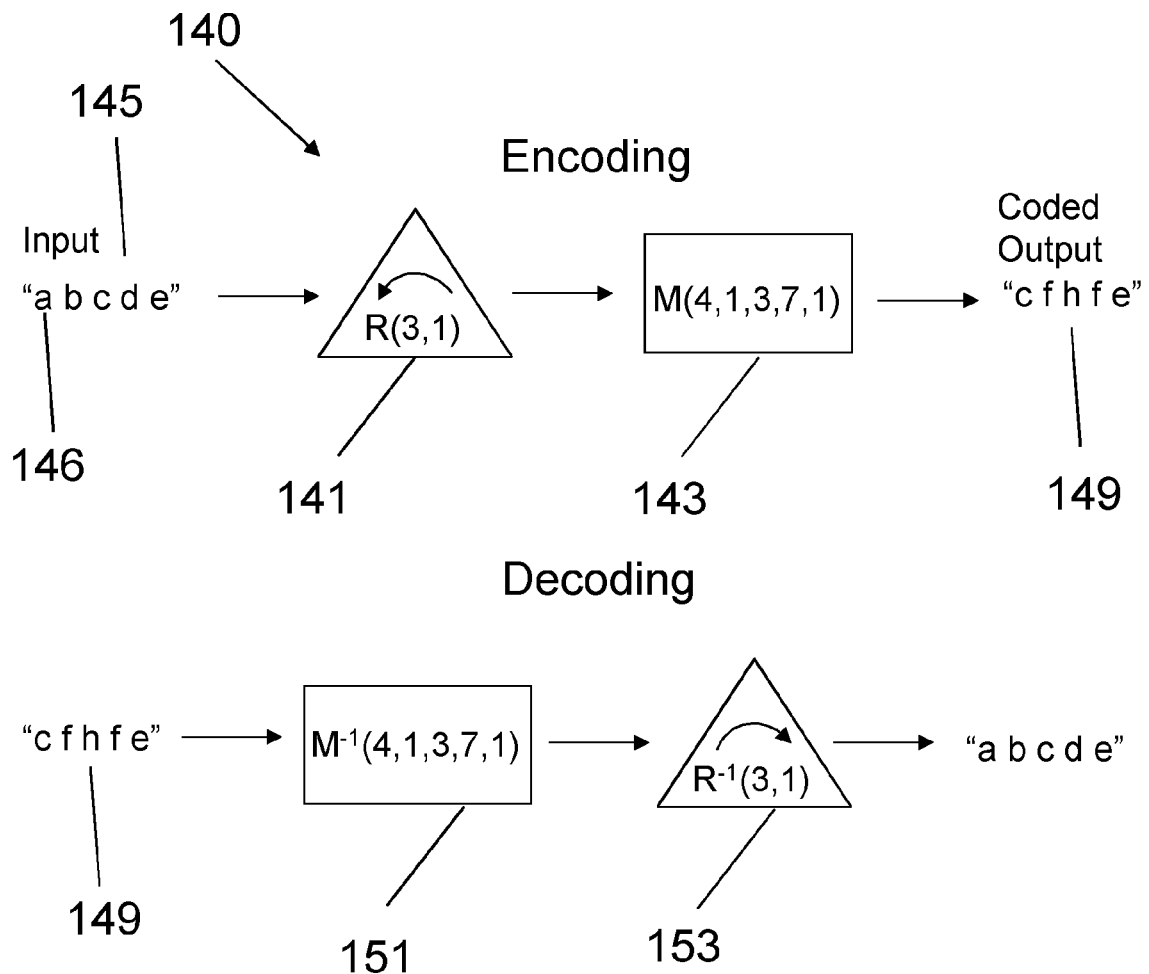
FIGS. 8 to 12 illustrate a method of encoding data according to a third embodiment of the invention.

FIG. 8 shows an example arrangement 140 incorporating two encoding elements in series, and a method of encoding data using this arrangement, in accordance with a third embodiment. In this example arrangement, the first encoding element 141 is in the form of a rotation of +1 using a frame size of three characters, and is represented by the notation "R(3,1)", where "R" represents the type of encoding element (i.e. a Rotation), and "3,1" are the configuration parameters associated with that encoding element, specifying the frame size, and the number of positions by which the character in the frame are shifted, respectively. The second encoding element 143 in the form of a mapping of first unit +1, second unit +3, third unit +7, fourth unit +1, using a frame size of four characters, and is represented by the notation "M(4,1, 3,7,1)", where "M" represents the type of encoding element (i.e. a Mapping), and "4,1,3,7,1" are the configuration parameters associated with that encoding element, specifying the frame size and the increase in the numerical representation of each character in the sub-frame, respectively.

Figure 9:
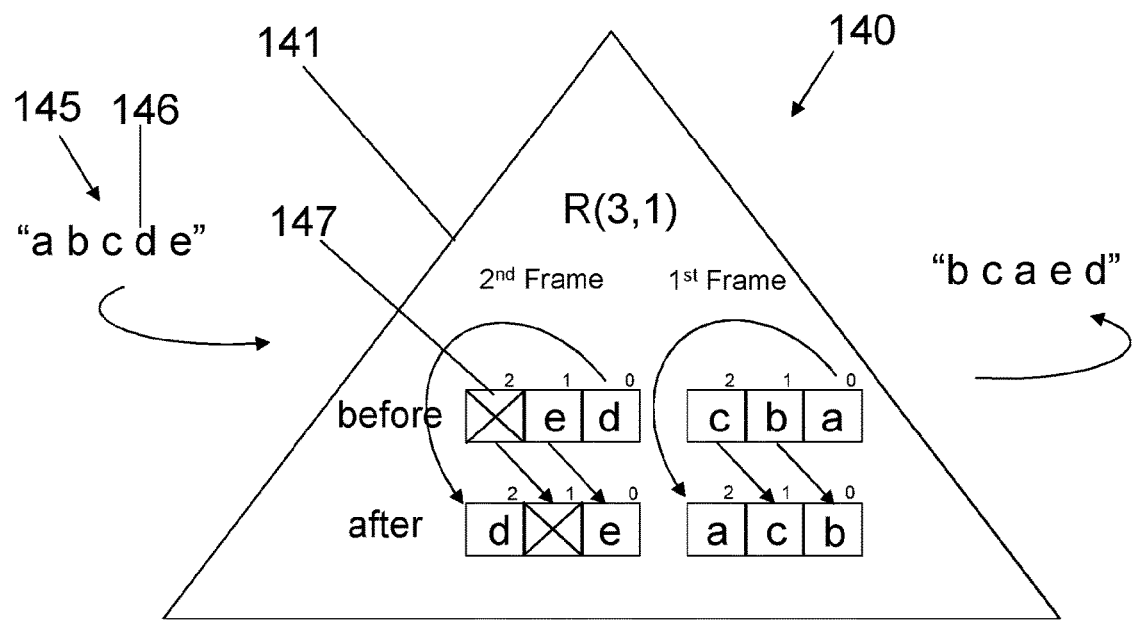

As shown in FIGS. 8 and 9, if a message 145 "abcde" comprises five units of data 146 ("a", "b", "c", "d", "e"), the first three ("a", "b", "c") of these five units will be passed as a first frame of data to the first encoding element 141 with the units being received in bins 0, 1, 2 of the frame, unit "a" being received first, "b" next, and "c" in the last bin of the first frame. In the example shown in FIGS. 8 and 9, the first encoding element performs a bijection transformation, in the form of a single-step rotation of the characters around the frame, with "abc" (in FIG. 9 being shown as [c][b][a]) being transformed into "bca" (in FIG. 9 being shown as [a][c][b]). It will be appreciated that the characters in the frames as shown inside the encoding elements in FIGS. 9, 10, 11, and 12 are shown in the order the frames are filled—with the rightmost (zeroth) bin of each frame receiving the first incoming unit of data and the bins to the left filling up subsequent incoming units of data. The remaining two units ("e", "d") are passed as the second frame received by the first encoding element. This second frame includes an empty bin 147, because the frame size of the encoding element is three whereas only two units of data remain. A flush function command is issued, which indicates to the encoding element 141 that no more units of data will be received. These units will also be transformed, with the result that ("d", "e") becomes ("e", "d").

Figure 10:
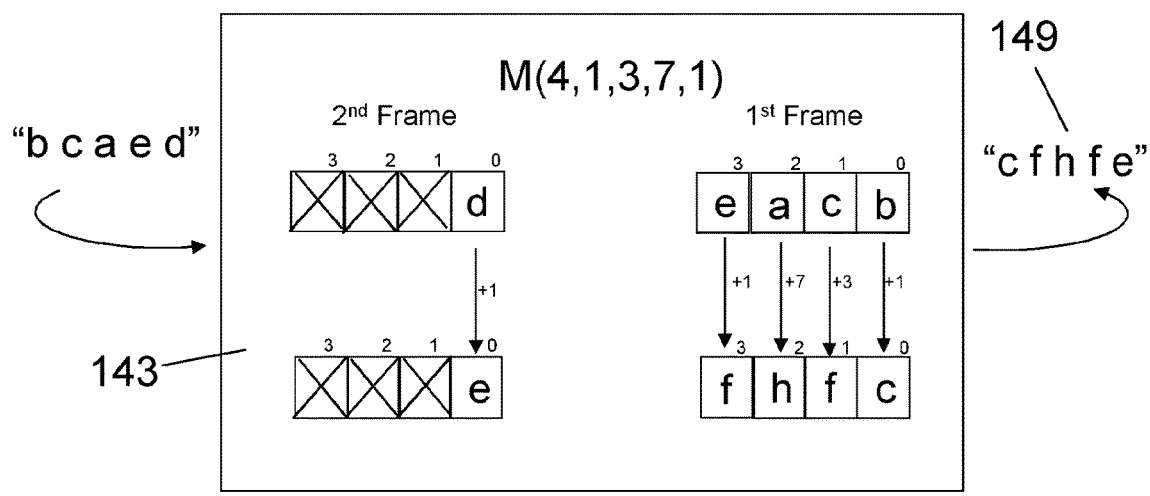

As shown in FIGS. 8 and 10, the transformed units "bca" will then be passed to the second encoding element 143. In this example, as the second encoding element 143 is arranged to receive four units of data. The units "b", "c", "a", "e" will be received ("b" in first, and "e" in last). In this example, the second encoding element performs a mapping function (+1, +3, +7, +1), and will generate as an output the series "cfhf" (in FIG. 10 being shown as [f][h][f][c]). The last remaining unit of data (the letter "d") will then pass through the second frame of the second encoding element 143, as a partial frame accompanied by a flush command, yielding the last outputted unit as "e". The final encoded message 149 outputted is thus "cfhfe".

Figure 11:
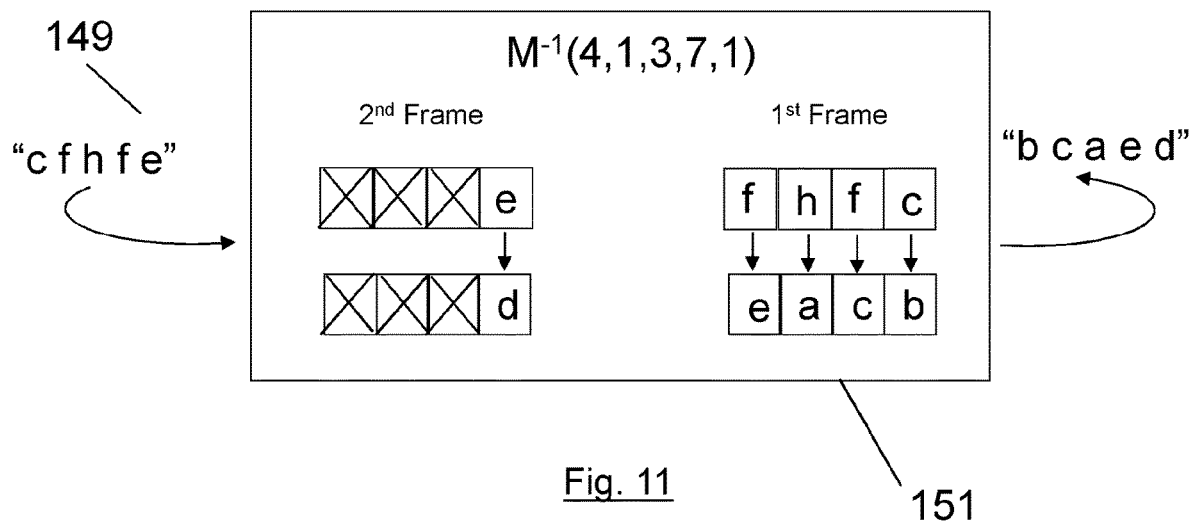
Figure 12:
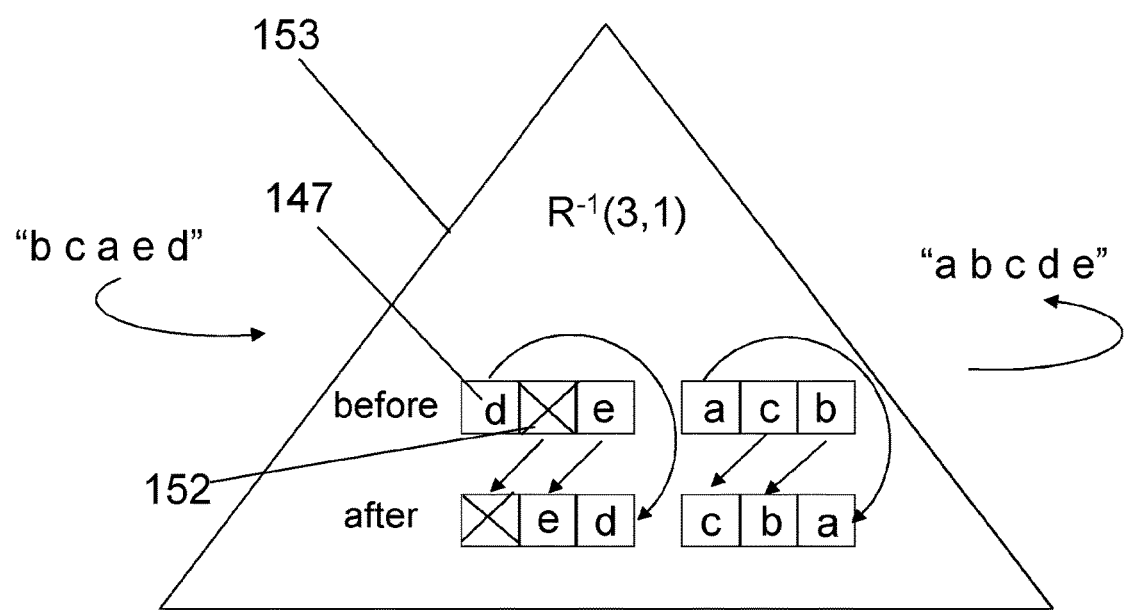

As each of the transformations performed by the encoding elements are bijections, in order to decode the encrypted message, the reverse transformations are applied, as shown in FIGS. 8, 11 and 12.

As shown in FIGS. 8 and 11, the encoded message 149 "cfhfe" is inputted to an encoding element 151 (effectively a decoding element) which is arranged to receive four units of data at a time, and which performs an inverse mapping function (represented by the notation "$M^{-1}(4,1,3,7,1)$"). The first four characters that are received are "cfhf" which are output from this element as "bcae". The encoding element 151 receives the last remaining unit of data "e" as an incomplete second frame, which on receipt of a flush command, is mapped to a single unit "d". The output from the encoding element 151 is thus "bcaed". As shown in FIGS. 8 and 12, these units are then passed to an encoding element 153 (effectively a decoding element), which performs the inverse rotation (represented by the notation "$R^{-1}(3, 1)$") of the encoding element 141 described above. The first three units of data are received as "bca" so that the output of the first frame from encoding element 153 is "abc". The remaining two units of data "ed" are passed as an incomplete frame, accompanied by a flush command, to encoding element 153. The sub-frame is then filled in the order it would have been emptied, so that the second bin 152 (the middle bin) is left empty. The output from the second (incomplete sub-frame) processed by element 153 is thus "de". The resulting output from these two decoding elements 151, 153 is therefore "abcde", namely the original message that was encoded by the corresponding encoding elements 141, 143.

It can therefore be seen that passing the encrypted message through the inverse of the encoding elements, the original message can be deciphered. The method of the present embodiment advantageously employs a flushing function, which indicates the end of a message, and prompts encoding elements to transform incomplete frames. This is an improvement over the use of padding which has previously been employed in encoding elements of the prior art. There are many different types of padding schemes. Some rely on a stream of blanks or repeated units of data at the end of a message to mimic full frame sizes. Padding schemes can leave a message vulnerable to attack, as a predetermined stream of data at the end of the message, particularly if discoverable, may be more readily decipherable in an encoded message and may then give information on how to decode other parts of the message. The use of a flushing function to indicate the end of a message negates the requirement to mimic full frame sizes, thus improving the security of the encoded message.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The way in which a particular encoding machine is uniquely expressed may be achieved in a different way. For example, the expression of the network may be effected using a particular language, different from that described above, but which enables each possible network of encoding elements to be uniquely and fully described. The expression of the network in that particular language may be converted into a descriptor by means of a lossless compression algorithm.

The nodes which deliver or collect units of data as they pass through a network of encoding/decoding elements, may in certain embodiments, themselves be considered as encoding/decoding elements and/or may process the units of data with additional encoding/decoding commands.

The following Clauses set out various combinations of subject matter considered to be within the scope of the present patent application:

Clause 1. An encoding machine (for example an encoding engine) made of encoding elements which rewrites a message, the rewriting being performed according to a configurable description of the process.

Clause 2. An encoding machine according to clause 1 in which the process can be built dynamically at run-time.

Clause 3. An encoding machine according to clause 1 in which the process can be built from a variety of encoding elements arranged serially.

Clause 4. An encoding machine according to clause 1 in which the process can be built from a variety of encoding elements arranged in parallel.

Clause 5. An encoding machine according to clause 1 in which the process can be built from a variety of encoding elements or nested groups of encoding elements, these groups being arranged in serial, parallel, or, nested in any combination, to any depth, to form a directed graph of encoding elements.

Clause 6. An encoding machine according to clause 1 in which a key can be supplied in order to transform the resulting encoding machine into an Encryption Engine.

Clause 7. An encoding machine according to clause 1 in which each encoding element is a bijection (and so invertible) allowing the combined encoding machine to be invertible and hence able to reconstitute an original message from its rewritten form.

Clause 8. An encoding machine according to clause 1 in which each encoding element is implemented in hardware, in order to provide greater rates of encoding.

Clause 9. An encoding machine according to clause 1 in which the encoding machine's work can be carried out by a single processor on a single computer, multiple processors on a single multi-processor computer, or multiple processors spread over multiple co-operating multi-processor computers.

Clause 10. A Network encoding machine Description Language to describe the way in which a message is to be rewritten by an encoding machine.

Clause 11. A Network encoding machine Description Language according to clause 10 in which encoding elements can be configured and organised into a directed graph of encoding elements, branch nodes, and join nodes.

Clause 12. A Network encoding machine Description Language according to clause 10 in which encoding elements can be configured and organised in serial, parallel, or any combination.

Clause 13. A Network encoding machine Description Language according to clause 10 in which the configuration of encoding elements can, itself, be configured to change during the operation of the machine.

Clause 14. A Network encoding machine Description Language according to clause 10 in which the arrangement of encoding elements within the encoding machine can be configured to change during the operation of the machine.

Clause 15. A Network encoding machine Description Language according to clause 10 in which each expression of the language can be converted into a single natural number equivalent in meaning to the language expression.

Clause 16. A Network encoding machine Description Language according to clause 10 in which each expression of the language can be reconstructed from a single natural number equivalent in meaning to the language expression.

Clause 17. An encoding element which can rewrite the digits of a stream of digits, the rewriting being according to, and, described by, a sub-expression of a Network encoding machine Description Language.

Clause 18. An encoding element according to clause 17 in which input digits are rearranged into a different order, the new order being controlled by the encoding element's configuration in the form of a sub-expression of a Network encoding machine Description Language.

Clause 19. An encoding element according to clause 17 in which input digits are substituted by an equal number of alternative digits, the new digits being controlled by the encoding element's configuration in the form of a sub-expression of a Network encoding machine Description Language.

Clause 20. An encoding element according to clause 17 in which sets of input digits are substituted by an equal number of alternative digits, the new digits being controlled by the encoding element's configuration in the form of a sub-expression of a Network encoding machine Description Language.

Clause 21. An encoding element according to clause 17 in which the encoding element is able to process a partial input frame of digits.

Clause 22. An encoding element according to clause 17 in which a key can be supplied individually in order to transform the resulting encoding machine into an Encryption Engine.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A machine-implemented method of encrypting data, wherein the method comprises
   receiving a message, the message being represented by a series of units of data,
   configuring multiple encoding elements in a network, the encoding elements further configured to receive units of data and perform a transformation on the units of data to generate an output, the network of encoding elements forming an encryption machine and
   encrypting the message by passing each unit of data through the encryption machine so that each unit of data is processed by at least one of the encoding elements,
   and wherein
   the configuring of the network of encoding elements defines how each unit of data is transformed by the encoding elements and defines how encoding elements are arranged in serial or parallel groups, creating an encryption machine having a frame size that is dependent upon the number of units of data in the series,
   the frame size of the encryption machine being defined as the maximum number of units of data that can pass through the network without any unit of data passing through the network and being processed in the same way as another unit of data, whereby an encryption machine having a larger frame size increases the challenge for an attacker attempting to analyse and decode a message encrypted by the encryption machine.

2. A method of claim 1, wherein the number of units of data representing the message received is guaranteed to be less than a pre-set maximum number.

3. A method of claim 1, wherein the network of encoding elements is dynamically configured to have a frame size greater than the number of units of data in a given message.

4. A method of claim 1, wherein the method is repeated for encrypting multiple different messages and the network of encoding elements is reconfigured in respect of each such message.

5. A method of claim 1, wherein the network of encoding elements is in the form of a network including at least some paths through the network where multiple encoding elements are configured in series and at least some paths through the network where multiple encoding elements are configured in parallel.

6. A method of claim 1, wherein
   an encoding element or a sub-network of encoding elements has a frame size being a first number having one or more prime factors,
   a different encoding element or sub-network of encoding elements has a frame size being a second number having one or more prime factors, and
   a different encoding element or sub-network of encoding elements has a frame size being a third number having one or more prime factors, the first, second and third numbers being such that the prime factors of each of the first, second and third numbers each comprise at least one prime factor that is not a prime factor of the other two numbers.

7. A method of claim 1, wherein each encoding element is provided by a computer, there being at least one computer performing the processing of a unit of data by one encoding element being different from another computer performing the processing of a unit of data by a different encoding element.

8. A method of claim 1, wherein each encoding element performs a transformation on each unit of data that it receives, and wherein the transformation is a mathematical bijection.

9. A method according to claim 1, wherein at least one of the encoding elements is arranged to process units of data by substituting each unit of data with a replacement unit of data by means of a mapping function.

10. A method according to claim 1, wherein at least one of the encoding elements is arranged to process units of data by receiving multiple units of data as a set and then replacing the units of data in the set with a different set as a reversible transformation.

11. A method according to claim 1, wherein the network of encoding elements is in the form of a directed graph including at least some paths through the network where multiple encoding elements are configured in parallel and the network includes at least one node which delivers sets of data to different branches of the network which are arranged in parallel, data being delivered in accordance with a predetermined sequence.

12. A method of claim 1, wherein the step of configuring the encoding elements in the network includes generating a descriptor, which uniquely defines the network.

13. A method according to claim 12, wherein the descriptor is private.

14. A method according to claim 1 further including a machine-implemented method of decrypting data previously encrypted with the use of the method of claim 1, wherein the decrypting method comprises
    receiving an encrypted message, being represented by a series of units of data,
    configuring multiple decoding elements in a network, the network of decoding elements forming a decryption machine and
    decrypting the message by passing each unit of data through the decryption machine so that each unit of data is processed by at least one of the decoding elements.

15. A data processing apparatus for performing the method of claim 1, wherein the data processing apparatus comprises multiple reconfigurable encoding/decoding elements.

16. A data processing apparatus according to claim 15, wherein at least some of the multiple reconfigurable encoding/decoding elements are provided by means of a programmed computer.

17. A data processing apparatus according to claim 15, wherein at least some of the multiple reconfigurable encoding/decoding elements are implemented in hardware.

18. A non-transitory computer-readable medium having stored therein instructions that are executable to cause a computing device to perform the method of claim 1.

19. A non-transitory computer-readable medium having stored therein instructions that are executable to cause a computing device to perform a method of conversion between (a) a particular encryption/decryption machine for encoding or decoding a message represented by a series of units of data and (b) a corresponding descriptor that uniquely defines that encryption/decryption machine, the method comprising:
    receiving a descriptor defining an encryption/decryption machine; and
    configuring multiple encoding/decoding elements in a network forming the encryption/decryption machine in accordance with the descriptor;
    wherein
    the encryption/decryption machine includes multiple encoding/decoding elements configured in the network, the encoding/decoding elements further configured to receive units of data and perform a transformation on the units of data to generate an output, such that the message is encrypted/decrypted by passing each unit of data through the encryption/decryption machine so that each unit of data is processed by at least one of the encoding/decoding elements,
    and the configuration of the network of encoding/decoding elements defines how each unit of data is transformed by the encoding/decoding elements and defines how encoding elements are arranged in serial or parallel groups, creating an encryption/decryption machine having a frame size that is dependent upon the number of units of data in the series, the frame size of the encryption/decryption machine being defined as the maximum number of units of data that can pass through the encryption/decryption machine without any unit of data passing through the encryption/decryption machine and being processed in the same way as another unit of data, whereby an encryption/decryption machine having a larger frame size increases the challenge for an attacker attempting to analyse and decode a message encrypted by the encryption/decryption machine.

20. A machine-implemented method of encrypting or decrypting data, wherein the method comprises
    receiving a message, the message being represented by a series of units of data,
    configuring multiple encoding/decoding elements in a network, the encoding/decoding elements being configured to receive units of data and to perform a transformation on the units of data to generate an output, the configuring of the network of encoding/decoding elements defining how each unit of data is transformed by the encoding/decoding elements and how encoding/decoding elements are arranged in serial or parallel groups, the network of encoding/decoding elements forming an encryption machine/decryption machine and
    performing a transformation on the message by passing each unit of data through the encryption/decryption machine so that each unit of data is processed by at least one of the encoding/decoding elements,
    and wherein
    an encoding/decoding element or a sub-network of encoding/decoding elements has a frame size being a first number having one or more prime factors,
    a different encoding/decoding element or sub-network of encoding/decoding elements has a frame size being a second number having one or more prime factors, and
    a different encoding/decoding element or sub-network of encoding/decoding elements has a frame size being a third number having one or more prime factors, and
    the first, second and third numbers being such that the prime factors of each of the first, second and third numbers each comprise at least one prime factor that is not a prime factor of the other two numbers,
    the frame size of an encoding/decoding element or sub-network of encoding/decoding elements being defined as the maximum number of units of data that can pass through the encoding/decoding element or sub-network of encoding/decoding elements without any unit of data passing through the encoding element/decoding or sub-network of encoding/decoding elements and being processed in the same way as another unit of data.

21. A method according to claim 1, wherein the configuring multiple encoding elements in a network forms an encryption engine.

* * * * *